United States Patent
Yamashita et al.

(10) Patent No.: US 9,551,890 B2
(45) Date of Patent: Jan. 24, 2017

(54) ELECTRONIC APPARATUS

(71) Applicant: Panasonic Corporation, Osaka (JP)

(72) Inventors: Shuji Yamashita, Nara (JP); Yukiharu Wakiguchi, Osaka (JP); Eiji Saitou, Osaka (JP); Kazutaka Goto, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 87 days.

(21) Appl. No.: 14/306,671

(22) Filed: Jun. 17, 2014

(65) Prior Publication Data

US 2015/0185537 A1 Jul. 2, 2015

(30) Foreign Application Priority Data

Dec. 26, 2013 (JP) .................................. 2013-268664
May 15, 2014 (JP) .................................. 2014-101034

(51) Int. Cl.
*G06F 1/16* (2006.01)
*G02F 1/1333* (2006.01)
*H05K 5/00* (2006.01)
*H05K 7/00* (2006.01)

(52) U.S. Cl.
CPC .................. *G02F 1/133308* (2013.01); *G02F 2001/133311* (2013.01); *G06F 1/1601* (2013.01); *G06F 1/1607* (2013.01); *G06F 1/1609* (2013.01); *G06F 1/1656* (2013.01)

(58) Field of Classification Search
CPC ................... G02F 1/133308; G02F 2201/503; G02F 2001/133311; G02F 2001/133314; G02F 2001/133317; G02F 2001/13332; G02F 2201/133322; G02F 2001/133325; G02F 2001/133328; G02F 2001/133331; G06F 1/1601; G06F 1/1607; G06F 1/1609; G06F 1/1656
USPC ............ 349/60; 361/679.21, 679.22, 679.26, 361/679.3, 679.36, 679.61
See application file for complete search history.

(56) References Cited

U.S. PATENT DOCUMENTS 5,383,034 A * 1/1995 Imamura .............. H04N 1/0312
    250/208.1
8,218,302 B2 * 7/2012 Sato ...................... G06F 1/1616
    312/223.2

FOREIGN PATENT DOCUMENTS

| JP | 6-188577 | | 7/1994 |
| JP | 7-249880 | | 9/1995 |
| JP | 2004-208046 | A | 7/2004 |
| JP | 2013106138 | A * | 5/2013 |

* cited by examiner

*Primary Examiner* — Binh Tran
(74) *Attorney, Agent, or Firm* — Renner, Otto, Boisselle & Sklar, LLP

(57) ABSTRACT

Provided is an electronic apparatus having the waterproof structure. The electronic apparatus includes: a housing; a transparent panel which has an image display area; and a plurality of strip-shaped waterproof spacers fixed adherently between the housing and the transparent panel, and fixed adherently to an outer periphery of the image display area at the transparent panel side. A clearance between the waterproof spacers adjacent to each other is filled with a filler. In the electronic apparatus, a hole is formed in the housing such that the hole overlaps with the clearance and a portion of the waterproof spacer, and the hole is filled with the filler.

5 Claims, 10 Drawing Sheets

ELECTRONIC APPARATUS

BACKGROUND OF THE INVENTION

1. Field of the Invention

This disclosure relates to an electronic apparatus having the waterproof structure.

2. Description of the Related Art

Recently, an electronic apparatus having a waterproof function such as a television receiver set for a kitchen or a television receiver set for a bathroom has been sold in the market for being used in facilities which use water such as a bathroom or a kitchen. A waterproof function may be acquired such that electronic parts and an image display part of an electronic apparatus are housed in a waterproof housing in order to prevent the intrusion of water into the inside of the electronic apparatus. For example, Unexamined Japanese Patent Publication No. 2004-208046 discloses the constitution where an adhesive agent is used for fixing an outer frame and a transparent plate for completely sealing a bathroom television receiver set.

SUMMARY OF THE INVENTION

In the constitution where an electronic apparatus such as a bathroom television receiver set is sealed using an adhesive agent, to advance to a next manufacturing step, it is necessary to wait for curing of the adhesive agent after coating the adhesive agent.

There has been also known a method where an electronic apparatus such as a bathroom television receiver set is sealed using a double-sided tape in place of an adhesive agent. In this method, the whole surface of a transparent plate is fixed to an outer frame by a double-sided tape for ensuring waterproof property between the transparent plate and the outer frame. To surely acquire waterproof property, the double-sided tape has an endless frame shape formed by cutting away a center portion from a double-sided tape original board having a rectangular shape. However, the operation of laminating the transparent plate to the outer frame becomes difficult along with the increase of a size of a display part of the electronic apparatus, and a center portion cut away from the rectangular double-sided tape becomes a waste, thus largely pushing up a material cost.

Accordingly, it is an object of the present disclosure to provide an electronic apparatus which can acquire the waterproof structure easily at a low cost.

An electronic apparatus according to this disclosure is constituted of: a housing; a transparent panel having an image display area; and a plurality of strip-shaped waterproof spacers fixed adherently between the housing and the transparent panel, and fixed adherently to an outer periphery of the image display area at the transparent panel side. A clearance between the waterproof spacers adjacent to each other is filled with a filler.

The electronic apparatus according to this disclosure can realize the waterproof structure easily at a low cost.

DETAILED DESCRIPTION OF THE INVENTION

Hereinafter, embodiments will be described in detail by reference to drawings appropriately. However, the excessively detailed explanation may be omitted when appropriate. For example, the detailed explanation of well-known matters or the repeated explanation of the substantially same constitution may be omitted. These are taken for preventing the explanation made hereinafter from being unnecessarily redundant, thus facilitating the understanding of this disclosure by those who are skilled in the art.

There is provided the attached drawings and the explanation made hereinafter for enabling those who are skilled in the art to sufficiently understand this disclosure, and the subjects defined in CLAIMS are not intended to be restricted by the attached drawings and the explanation made hereinafter.

Embodiment

Hereinafter, the embodiment is explained by reference to drawings. In this embodiment, the explanation is made by using a liquid crystal display device as an example of an electronic apparatus.

Figure 1:
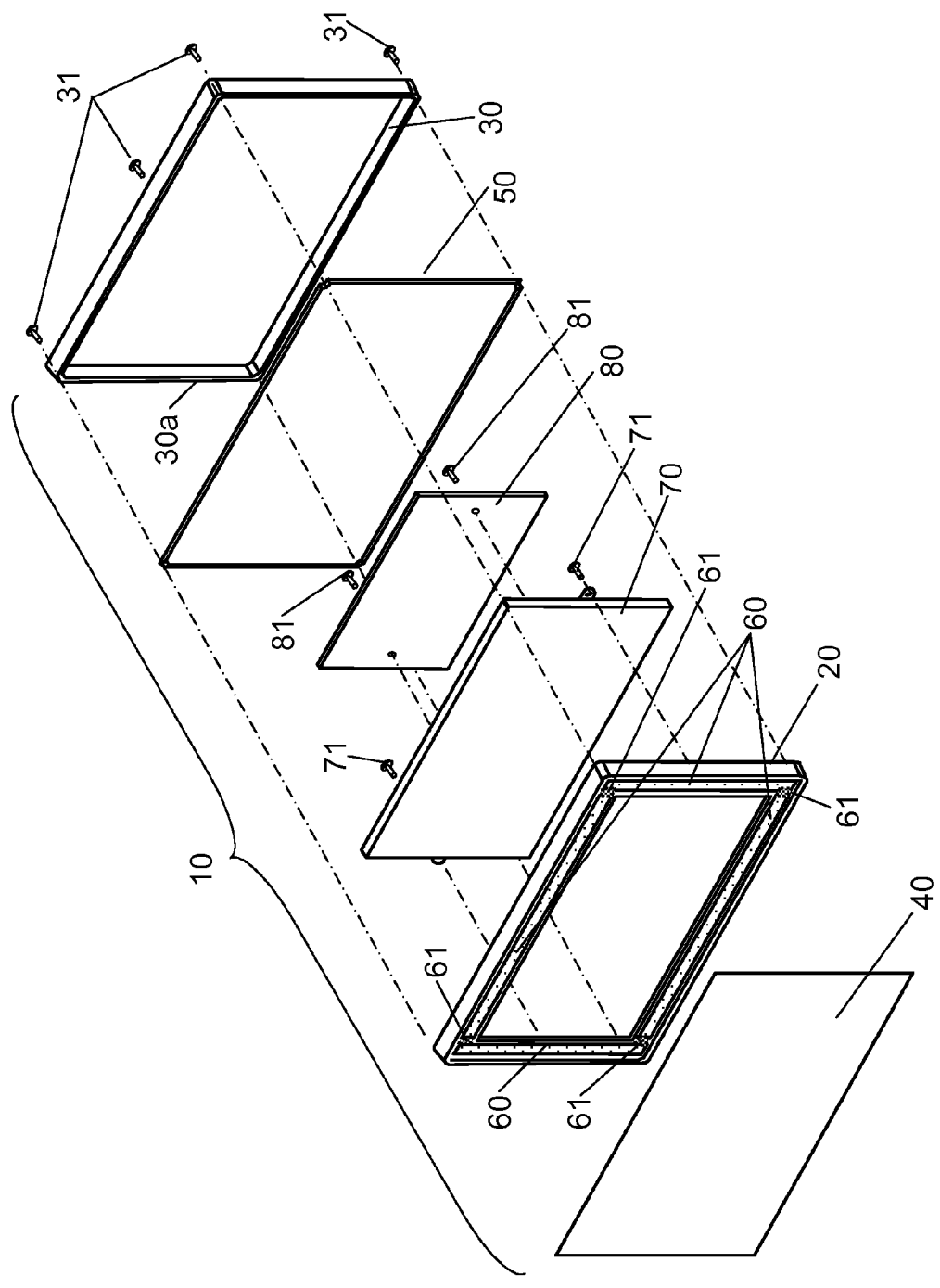
FIG. 1 is an exploded perspective view of a liquid crystal display device according to an embodiment.
Figure 2:
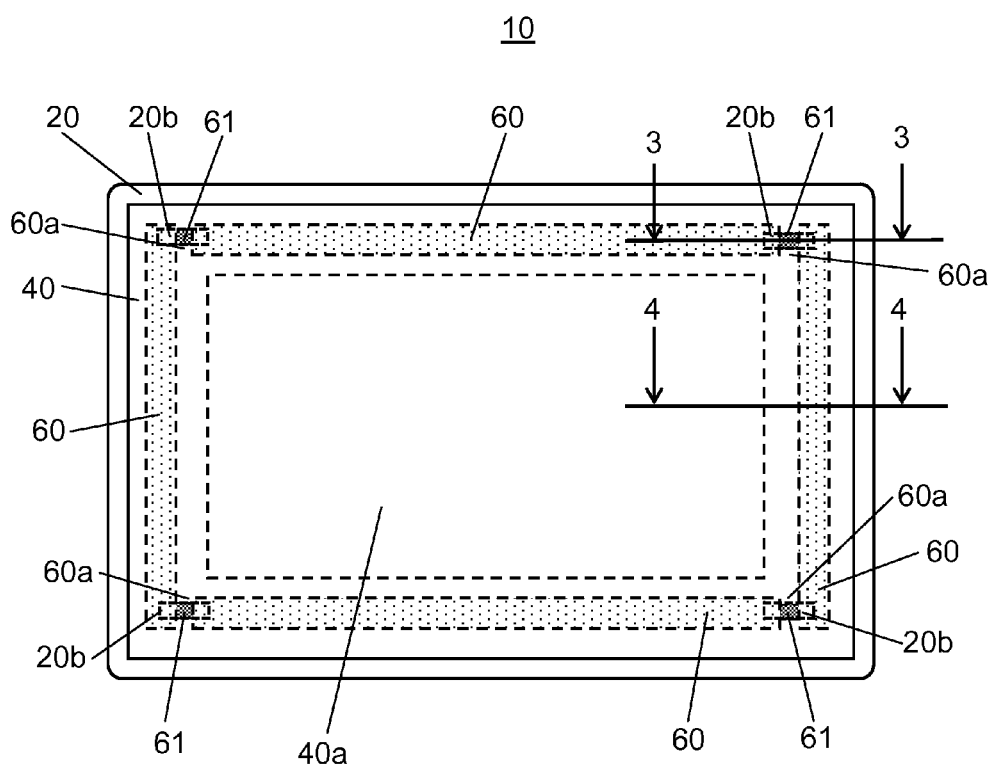
FIG. 2 is a front view of the liquid crystal display device according to the embodiment.
Figure 3:
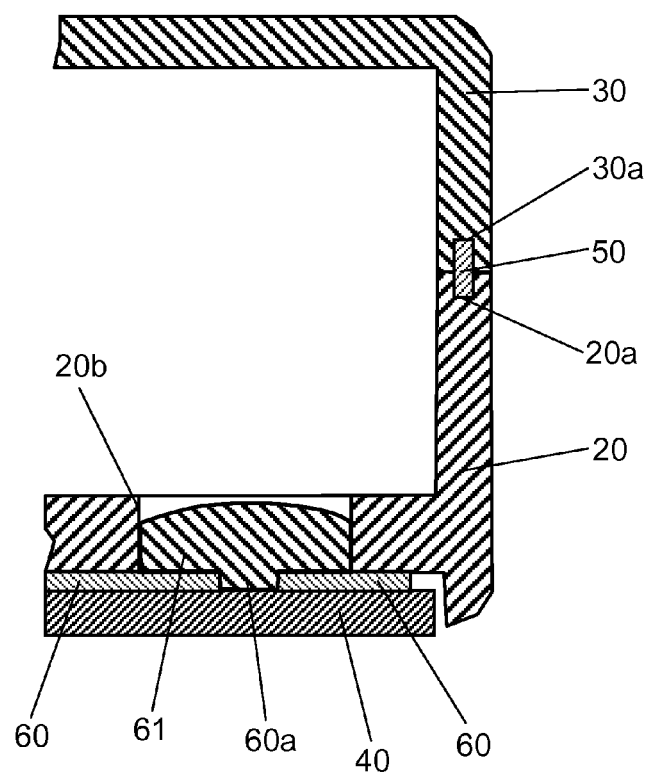
FIG. 3 is a cross-sectional view taken along line 3-3 in FIG. 2.
Figure 4:
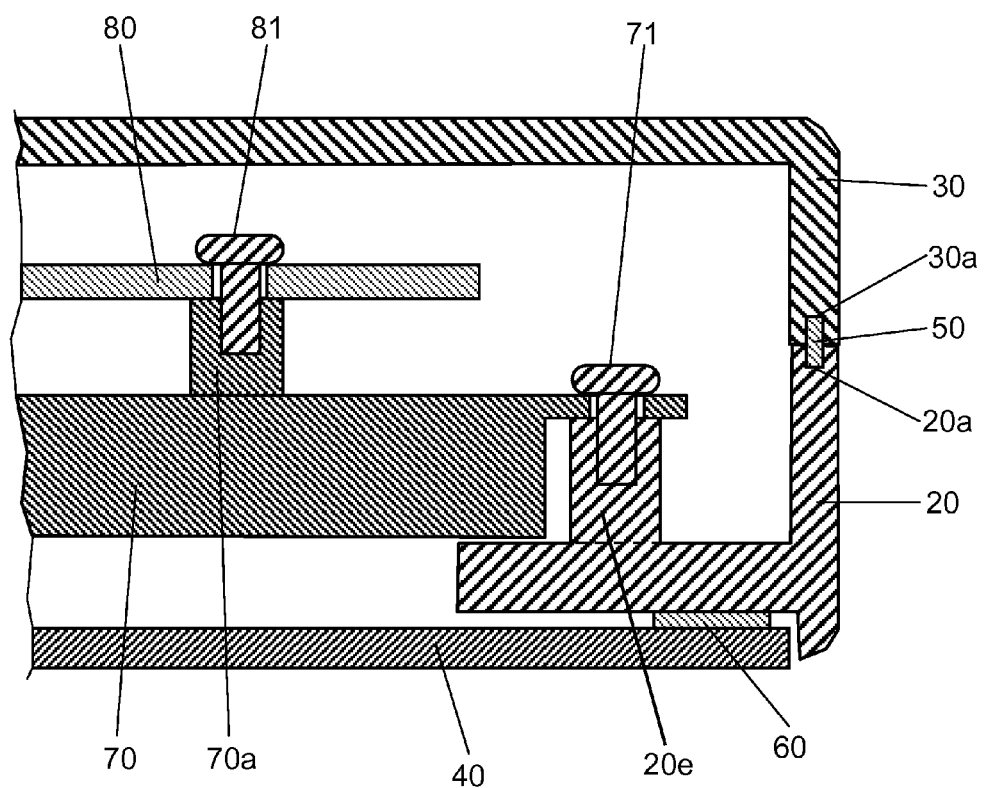
FIG. 4 is a cross-sectional view taken along line 4-4 in FIG. 2.

FIG. 1 is an exploded perspective view of a liquid crystal display device, FIG. 2 is a front view of the liquid crystal display device, FIG. 3 is a cross-sectional view taken along line 3-3 in FIG. 2, and FIG. 4 is a cross-sectional view taken along line 4-4 in FIG. 2.

[1. Overall Constitution of Liquid Crystal Display Device]

Firstly, the overall constitution of liquid crystal display device 10 is explained by reference to FIG. 1 and FIG. 4. The outer side of liquid crystal display device 10 is constituted of housing 20, back cover 30 and transparent panel 40. Liquid crystal display module 70 and printed circuit board 80 are incorporated into liquid crystal display device 10. Back cover 30 and housing 20 are fixed to each other by a plurality of screws 31.

In liquid crystal display device 10, to ensure waterproof property of a portion where housing 20 and back cover 30 are brought into contact with each other, packing member 50 is sandwiched between recessed groove 20a formed in housing 20 and recessed groove 30a formed in back cover 30 in a compressed state. Packing member 50 has an endless ring shape. Recessed groove 20a is formed over the whole circumference of housing 20 in conformity with the shape of packing member 50, and recessed groove 30a is also formed over the whole circumference of back cover 30 in conformity with the shape of packing member 50. Packing member 50 may be made of an elastic material such as silicon or urethane.

Liquid crystal display module 70 is fixed to a plurality of bosses 20e formed on housing 20 by screws 71 respectively, and printed circuit board 80 is fixed to a plurality of bosses 70a formed on liquid crystal display module 70 by screws 81 respectively.

[2. Waterproof Structure of Liquid Crystal Display Device]

Next, the waterproof structure of liquid crystal display device 10 is explained by reference to FIG. 2 and FIG. 3.

Transparent panel 40 has rectangular image display area 40a. Waterproof spacers 60 are laminated between transparent panel 40 and housing 20 so as to be fixed adherently to transparent panel 40 and housing 20. To be more specific, four strip-shaped waterproof spacers 60 having a narrow width are laminated to four respective sides of an outer peripheral portion of image display area 40a of transparent panel 40. Clearance 60a formed between waterproof spacers 60 at four corners is filled with filler 61. Further, clearance 60a is filled with filler 61 such that portions of filler 61 and portions of waterproof spacers 60 overlap with each other, thus ensuring waterproof property.

Clearance 60a is filled with filler 61 in the following manner. Firstly, transparent panel 40 and housing 20 are fixed adherently to each other by four waterproof spacers 60. Next, as shown in FIG. 3, hole 20b having a rectangular parallelepiped shape is formed in housing 20 in advance at four corners where the clearance is formed between waterproof spacers 60, and the clearance is filled with filler 61 through hole 20b. In this manner, the filling operation of filler 61 can be performed easily.

Holes 20b may be formed simultaneously with the formation of housing 20 by injection molding using the same mold or may be formed by cutting working or the like after forming housing 20.

[3. Optimum Condition to Form Waterproof Structure]

Next, the explanation is made with respect to a result of an experiment performed for acquiring an optimum condition to form the waterproof structure when a double-sided tape is used as waterproof spacers 60 and an adhesive agent is used as filler 61. Firstly, the mounting structure of housing 20 and transparent panel 40 is explained.

In this disclosure, it is assumed that a size of liquid crystal display module 70 is 5 or more inches. In the experiment, it is assumed that a size of liquid crystal display module 70 is 10 to 15 inches. In the embodiment, sizes of hole 20b having a rectangular parallelepiped shape are assumed such that the size in the longitudinal direction, that is, in the short size direction is set to 2 mm to 4 mm, the size in the lateral direction, that is, in the long side direction is set to 6 mm to 10 mm, and a width of the both-sided tape is set to 5 mm to 10 mm.

As an adhesive agent, a silicon-based adhesive agent which contains acrylic modified silicon as a main component is used. As the double-sided tape, a double-sided tape where a base material is made of a foamed urethane resin and adhesive portions are made of an acrylic tacky adhesive agent is used. The experiment is carried out under the above-mentioned conditions.

It is most important for the waterproof structure that clearance 60a is surely filled with an adhesive agent of filler 61. When viscosity of the adhesive agent is excessively high, the adhesive agent is cured before the filling of clearance 60a with the adhesive agent is completed, thus deteriorating waterproof property. On the other hand, when viscosity of the adhesive agent is excessively low, the adhesive agent flows out from clearance 60a and exudes to image display area 40a of transparent panel 40. It is understood from the experiment that appropriate viscosity of the adhesive agent falls within a range of 10 to 50 Pa·s/23° C., and preferably, within a range of 15 to 30 Pa·s/23° C. When clearance 60a between the double-sided tapes is filled with the adhesive agent having viscosity of 100 Pa·s/23° C. or more, the adhesive agent is cured before clearance 60a is completely filled with the adhesive agent and hence, clearance 60a cannot be completely sealed, whereby waterproof property cannot be ensured.

[4. Advantageous Effects and the Like]

As described above, according to this embodiment, the electronic apparatus includes: the housing; the transparent panel having the image display area; and the plurality of strip-shaped waterproof spacers fixed adherently between the housing and the transparent panel, and fixed adherently to the outer periphery of the image display area at the transparent panel side, and the clearance between the waterproof spacers adjacent to each other is filled with the filler.

In the electronic apparatus, the holes are formed in the housing such that each hole overlaps with the clearance and portions of the waterproof spacers, and the holes are filled with a filler.

In the electronic apparatus, the image display area has a rectangular shape, and four waterproof spacers are provided.

In the electronic apparatus, the waterproof spacer is formed of a double-sided tape.

In the electronic apparatus, the filler is an adhesive agent.

By using waterproof spacers 60 and filler 61 in combination, waterproof spacers 60 can be formed into a simple rectangular strip shape. Accordingly, a laminating operation of waterproof spacers 60 is facilitated. Further, waterproof spacers 60 can be cut out from an original board without producing a waste and hence, a material cost can be also lowered. Particularly, in the case where the size of image display area 40a becomes 10 or more inches, when a conventional double-sided tape having a rectangular frame shape is used, an area of a cut-away center portion becomes large, thus further pushing up a waste material cost.

In view of the above, according to this disclosure, a double-sided tape can be easily laminated, and at the same time, it is possible to provide the waterproof structure at a low cost.

Although the explanation has been made with respect to the case where hole 20b has a rectangular parallelepiped shape, the shape of hole 20b is not limited to such a shape, and may be a circular columnar shape, an elliptical columnar shape or the like.

Other Embodiments

Next, other examples of the waterproof structure of an electronic apparatus are explained.

[5. Shape of Hole Formed in Waterproof Structure]

Figure 5:
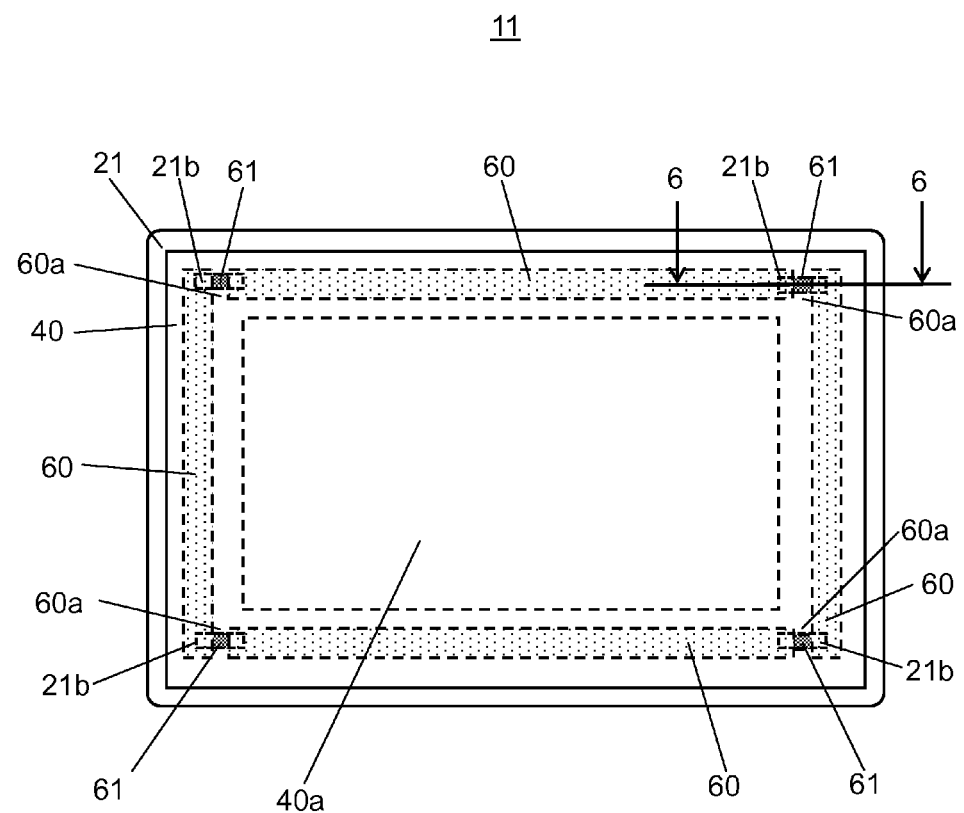
FIG. 5 is a front view of a liquid crystal display device according to another embodiment.
Figure 6:
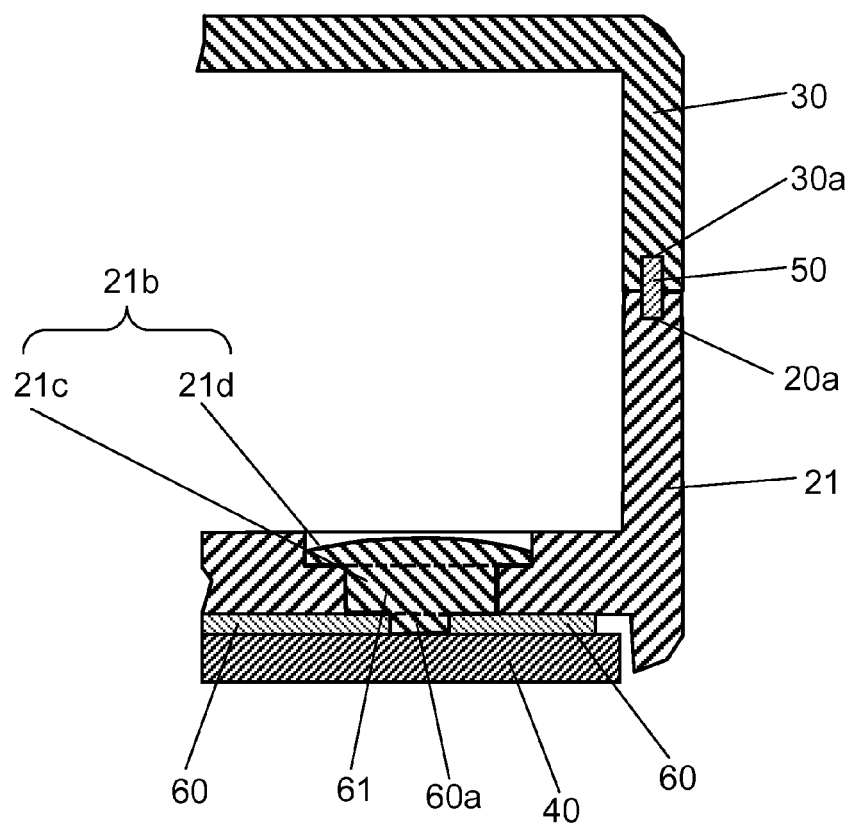
FIG. 6 is a cross-sectional view taken along line 6-6 in FIG. 5.

FIG. 5 is a front view of another liquid crystal display device, and FIG. 6 is a cross-sectional view taken along line 6-6 in FIG. 5. Liquid crystal display device 11 shown in FIG. 5 differs from liquid crystal display device 10 shown in FIG. 2 with respect to a shape of holes 21b formed in housing 21. In liquid crystal display device 11, hole 21b is formed of two holes both having a rectangular parallelepiped shape. To be more specific, as shown in FIG. 6, hole 21b formed in housing 21 has a two-stepped shape. That is, hole 21b is constituted of first-step hole 21c which has a rectangular parallelepiped shape, and second-step hole 21d which abuts with first-step hole 21c and has a stepped surface larger than a stepped surface of first-step hole 21c. By forming hole 21b into a two-stepped shape, an injection amount of filler 61 can be easily controlled. That is, by setting an injection amount of filler 61 when first-step hole 21c is filled with filler 61 up to an upper edge of first-step hole 21c as a minimum limit, and an injection amount of filler 61 when second-step hole 21d is filled with filler 61 up to an upper edge of second-step hole 21d as a maximum limit, an injection amount of filler 61 can be easily confirmed visually.

[6. Number of Waterproof Spacers in Waterproof Structure]

Figure 7:
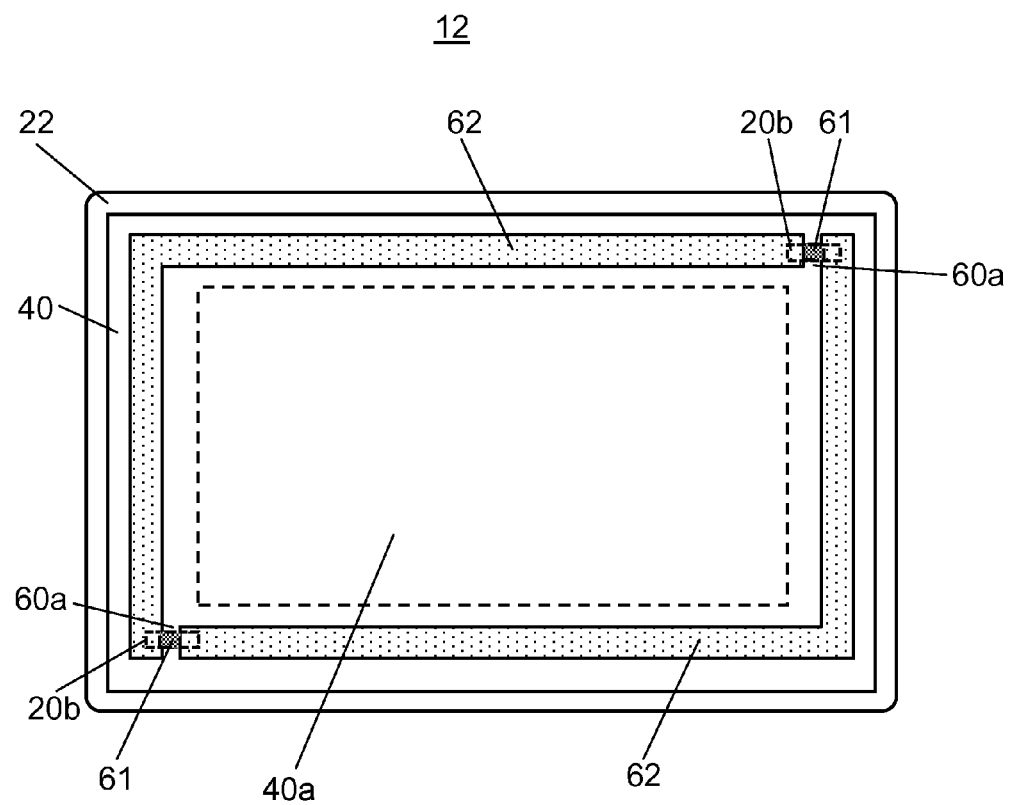
FIG. 7 is a front view of a liquid crystal display device according to another embodiment.

Next, with respect to the waterproof structure of an electronic apparatus, the explanation is made on a constitutional example which differs from the above-mentioned example in the shape of waterproof spacer. FIG. 7 is a front view of still another liquid crystal display device. Liquid crystal display device 12 shown in FIG. 7 differs from liquid crystal display device 10 shown in FIG. 2 with respect to a shape of waterproof spacer 62 as well as the number of waterproof spacers 62. Further, liquid crystal display device 12 shown in FIG. 7 differs from liquid crystal display device 10 shown in FIG. 2 with respect to the number of holes 20b formed in housing 22. To be more specific, liquid crystal display device 12 shown in FIG. 7 has two waterproof spacers 62 formed in an L shape. Accordingly, clearance 60a is formed at two positions. When waterproof spacer 62 is formed into an L shape, waterproof spacers corresponding to two sides of image display area 40a are simultaneously laminated and hence, a positional displacement defect is liable to occur compared to the lamination of waterproof spacers 60 in liquid crystal display device 10 shown in FIG. 2. However, when a size of an image display area is not so large, that is, the size of the image display area is approximately 5 inches, the influence exerted by positional displacement is relatively small, and rather, such waterproof structure of an electronic apparatus can acquire an advantageous effect that a laminating operation is speedily performed.

Figure 8:
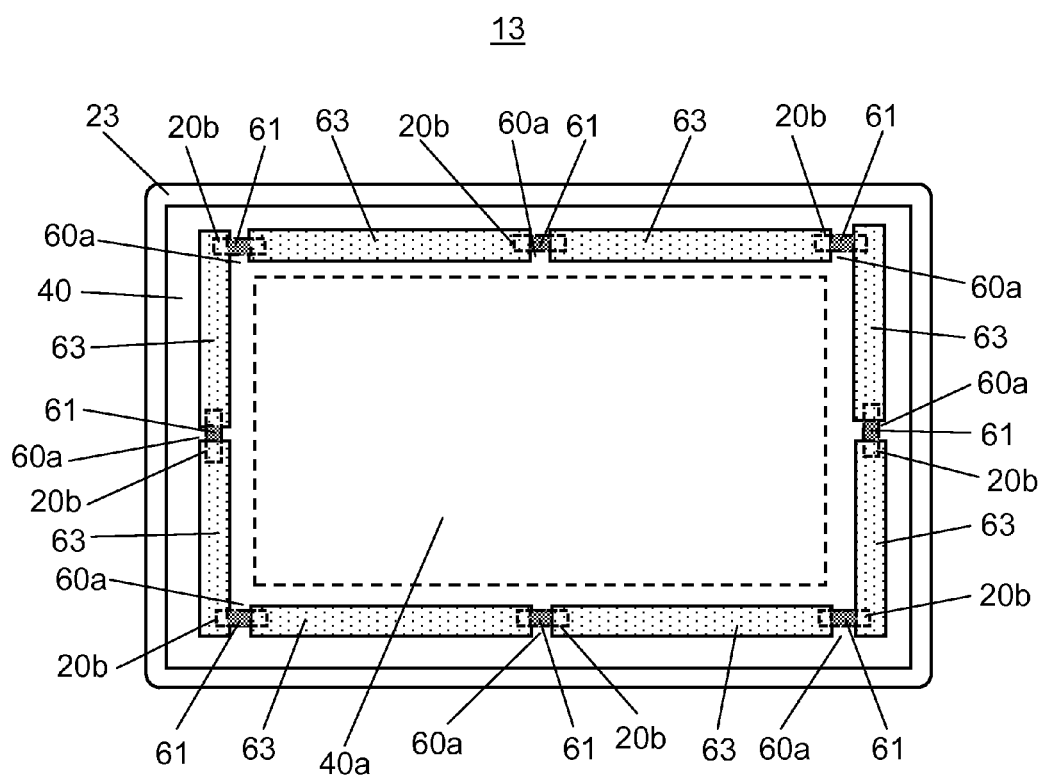
FIG. 8 is a front view of a liquid crystal display device according to another embodiment.

FIG. 8 is a front view of still another liquid crystal display device. Liquid crystal display device 13 shown in FIG. 8 differs from liquid crystal display device 10 shown in FIG. 2 with respect to the number of waterproof spacers 63. Also, liquid crystal display device 13 shown in FIG. 8 differs from liquid crystal display device 10 shown in FIG. 2 with respect to the number of holes 20b formed in housing 23. To be more specific, liquid crystal display device 13 shown in FIG. 8 has eight waterproof spacers 63. That is, two waterproof tapes are laminated to each side of image display area 40a. Accordingly, clearance 60a is formed at eight positions, and holes 20b formed in housing 23 are also formed at eight positions. When a size of image display area 40a in liquid crystal display device 13 is large, that is, the size of image display area 40a is 15 or more inches, a length of waterproof spacer 63 laminated to one side of image display area 40a becomes large and hence, it is advantageous to divide waterproof spacer 63 at a middle portion thereof for facilitating a laminating operation.

As described above, even when the waterproof structure of an electronic apparatus adopts the constitution where the number of waterproof spacers is other than four, the waterproof structure of an electronic apparatus can acquire the same waterproof effect as the waterproof structure of an electronic apparatus having four waterproof spacers.

[7. Shape of Image Display Area of Liquid Crystal Display Device]

Figure 9:
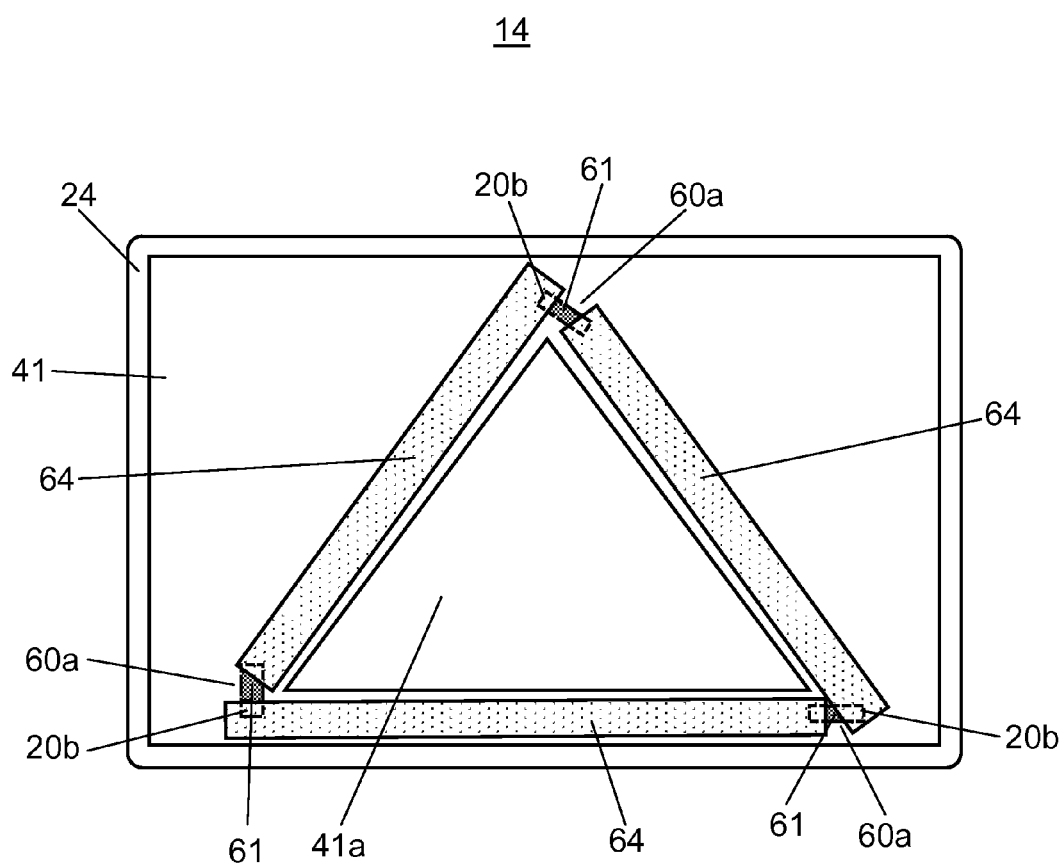
FIG. 9 is a front view of a liquid crystal display device according to another embodiment.

Next, the explanation is made with respect to the constitution of liquid crystal display device when a liquid crystal display module of the liquid crystal display device has a shape other than a rectangular shape, and an image display area of a transparent panel has a shape other than a rectangular shape corresponding to the shape of the liquid crystal display module. FIG. 9 is a front view of a liquid crystal display device where an image display area has a shape other than a rectangular shape. In liquid crystal display device 14 shown in FIG. 9, the liquid crystal display module has a triangular shape, and image display area 41a of transparent panel 41 has a triangular shape. Accordingly, waterproof spacer 64 is laminated to respective sides of the outer periphery of image display area 41a. That is, three waterproof spacers 64 are laminated to the outer periphery of image display area 41a. Accordingly, clearance 60a is formed at three positions, and holes 20b formed in housing 24 are also formed at three positions.

Figure 10:
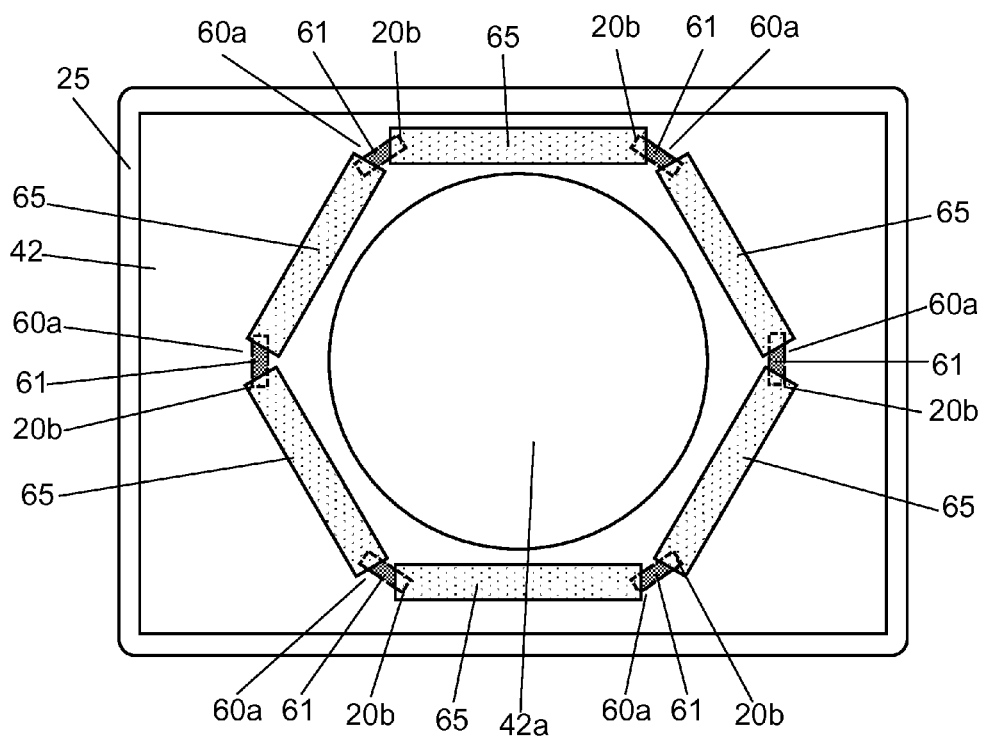
FIG. 10 is a front view of a liquid crystal display device according to another embodiment.

FIG. 10 is a front view of another liquid crystal display device where an image display area has a shape other than a rectangular shape. In liquid crystal display device 15 shown in FIG. 10, a liquid crystal display module has a circular shape, and image display area 42a of transparent panel 42 has a circular shape. Accordingly, six waterproof spacers 65 are laminated to the periphery of image display area 42a. Accordingly, clearance 60a is arranged at six positions, and holes 20b formed in housing 25 are also arranged at six positions.

As has been described heretofore, even when the shape of the liquid crystal display module of the liquid crystal display device differs from the shape of the liquid crystal module shown in FIG. 1 and FIG. 2 and the image display area has a shape other than a rectangular shape, with respect to the waterproof effect that waterproof property is ensured by fixing adherently the transparent panel and the housing to each other using a plurality of waterproof modules and by filling a clearance between the waterproof modules with a filler, these liquid crystal display devices can acquire the same waterproof effect as the liquid crystal display device having the rectangular image display area.

Although an acrylic modified silicon-based adhesive agent is used as an adhesive agent in this embodiment, as the same elastic adhesive agent, an epoxy-based adhesive agent, a urethane-based adhesive agent, a styrene-butadiene-rubber-based adhesive agent, a chloroprene-rubber-based adhesive agent, an olefin-based adhesive agent, an acrylonitrile-butadiene-rubber-based adhesive agent or the like may be also used.

Liquid curing agent which can fill a space while having no adhesive property may be also used in place of an adhesive agent. In this case, a silicon-based sealing agent or a polyurethane-based sealing agent may be used. A silicon-based tacky agent, a urethane-based tacky agent, a natural-rubber-based tacky agent, or an acrylic acid ester copolymer-based tacky agent may be used.

Although a double-sided tape where a base material is made of a foamed urethane resin and an adhesive portion is made of an acrylic tacky material is used as the waterproof spacer, the base material may be made of a polyethylene-based resin material, a polyolefin-based resin material or an ethylene vinyl acetate-based resin material. The tacky agent may be a butyl rubber-based tacky material. Further, the waterproof spacer may be formed of the combination of these materials.

What is claimed is:
1. An electronic apparatus comprising:
a housing;
a transparent panel which has an image display area; and
a plurality of strip-shaped waterproof spacers fixed adherently between the housing and the transparent panel, and fixed adherently to an outer periphery of the image display area at the transparent panel side, wherein a clearance between the waterproof spacers adjacent to each other is filled with a filler; and a hole is formed in the housing such that the hole overlaps with the clearance and a portion of the waterproof spacer, and the hole is filled with the filler.

2. The electronic apparatus according to claim 1, wherein the image display area has a rectangular shape, and four waterproof spacers are provided.

3. The electronic apparatus according to claim 1, wherein the hole is formed of two holes both having a rectangular parallelepiped shape respectively, and areas of surfaces of the two holes which abut with each other differ from each other.

4. The electronic apparatus according to claim 1, wherein the waterproof spacer is formed of a double-sided tape.

5. The electronic apparatus according to claim 1, wherein the filler is an adhesive agent.

\* \* \* \* \*